United States Patent [19]

Parras

[11] 4,123,846
[45] Nov. 7, 1978

[54] FRAMING SQUARE GUIDE

[76] Inventor: Manuel Parras, 2516 Damuth St., Oakland, Calif. 94602

[21] Appl. No.: 793,239

[22] Filed: May 3, 1977

[51] Int. Cl.² .............................................. B43L 13/04
[52] U.S. Cl. ..................................... 33/112; 33/75 R
[58] Field of Search ..................... 33/42, 43, 44, 112, 33/113, 32 R, 32 B, 32 C, 173, 75 R; 269/246, 257, 268, 287, 315

[56] References Cited

U.S. PATENT DOCUMENTS

| 590,729 | 9/1897 | Norden | 33/112 |
| 2,776,683 | 1/1957 | Cowley | 269/246 |
| 2,797,487 | 7/1957 | Mayer | 33/112 |
| 2,846,908 | 8/1958 | Kelly | 269/246 X |
| 3,394,457 | 7/1968 | Holder | 33/32 C |
| 3,783,518 | 1/1974 | Jones | 33/75 R |

Primary Examiner—Charles E. Phillips
Attorney, Agent, or Firm—Bielen and Peterson

[57] ABSTRACT

A framing square guide utilizing a member having an upper and lower portion defining a slot in the member. The slot is adapted for insertion of a portion of the framing square. Connected to the slotted member is a fence which has an outer surface. The lower surface of the lower portion of the slotted member is substantially perpendicular to the outer surface of the fence. Thus, the outer surface of the fence is able to guide tools using the framing square guide as a reference.

7 Claims, 7 Drawing Figures

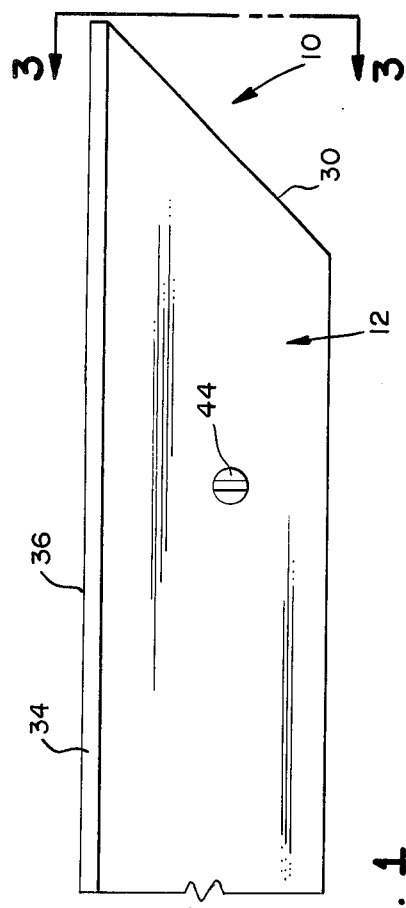
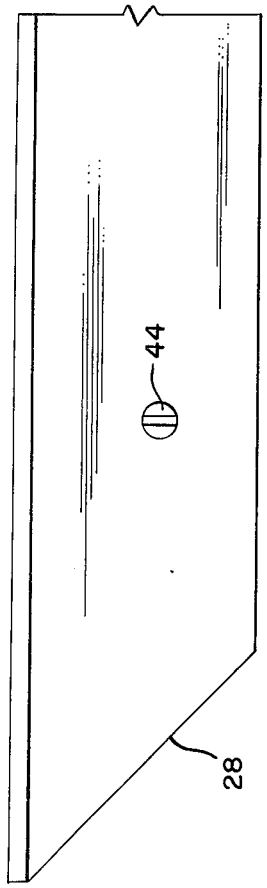
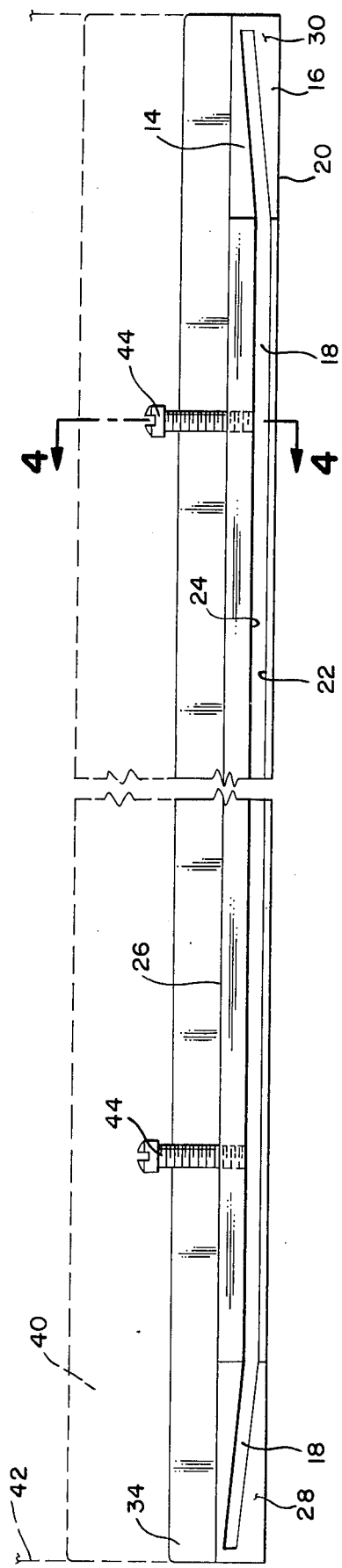
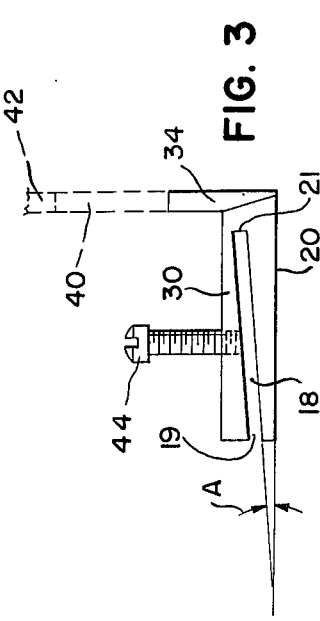
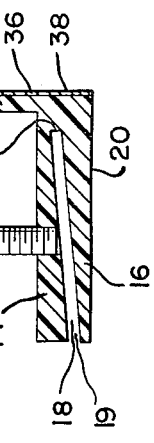
FIG. 1
FIG. 2
FIG. 3
FIG. 4

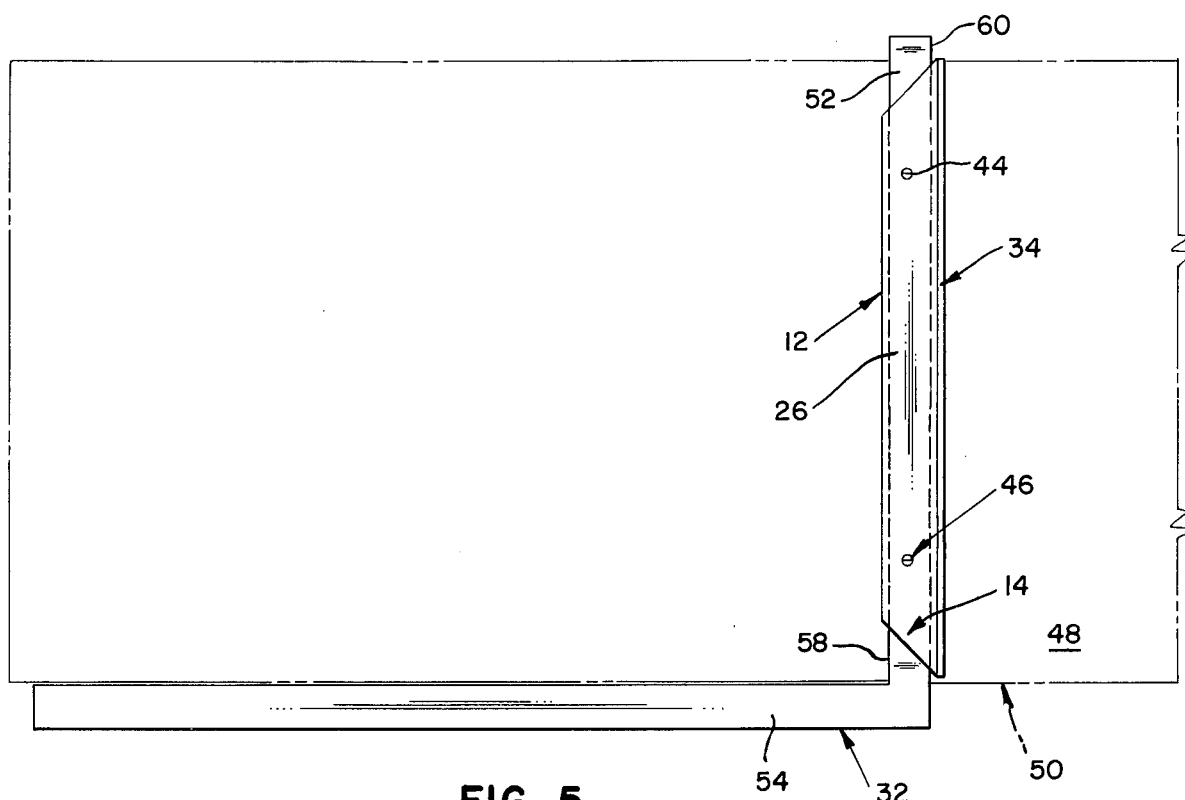
FIG. 5
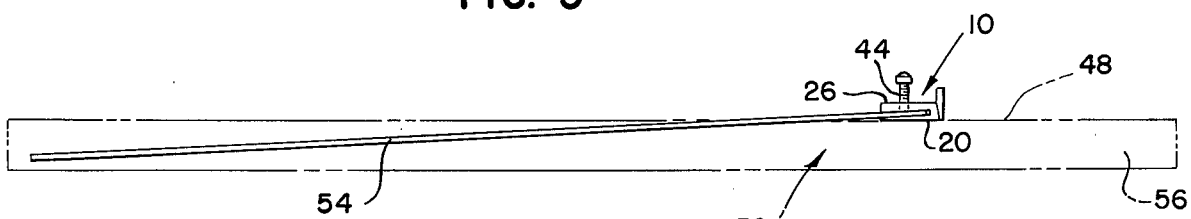
FIG. 6
FIG. 7
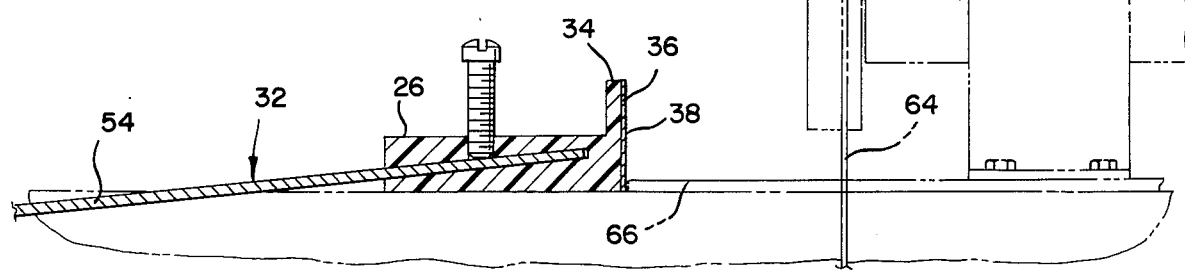

FRAMING SQUARE GUIDE

BACKGROUND OF THE INVENTION

Carpentry and joinery both concern the art and trade of cutting, working, and joining timber into structures. Much of the timber reaches the construction site as scantlings, which must be trimmed into the proper planks for the work to be performed. To perform the principal task of cutting and fixing the timbers, with such joining as is necessary, powered hand tools are largely used. For example, in the cutting, squaring, and birdsmouthing of roofing of rafter, the use of powered hand tools saves much time in such repetitive work.

The usual method of cutting or trimming a beam involves the use of a framing square, which permits accurate cuts perpendicular to the length of the beams being cut. The usual practice is to square up the board being cut and to draw a mark thereupon along the intended line of cutting by the saw blade. A more precise cut may be obtained by a table saw, however, this entails moving the lumber being trimmed to the side of the table saw. This involves substantially more effort on the worker's part than bringing the hand cutting tool to the site of the building materials.

No known prior art describes a guide mechanism for a framing square which will permit accurate cutting of timber without marking the line of the cut to be made.

The present invention relates to a novel frame square guide for powered hand cutting tools.

SUMMARY OF THE INVENTION

In accordance with the present invention, a novel framing square guide is provided. The guide employs a member having a slot formed by an upper and lower portion. The slot is adapted for insertion of a portion of the framing square. Connected to the slotted member is a fence having an outer surface. The lower surface of the lower portion of the slotted member and the outer surface of the fence form substantially an orthogonal surface which contacts the timber being cut and the edge of the hand tool performing the cutting.

The slot within the member may be formed to lie in a plane angularly disposed in relation to the lower surface of the lower portion of the slotted member.

Preferably, when the framing square spans the top of a timber the slot would be directed away from the outer surface of the fence and toward the lower surface of the lower portion of the slotted member. By this device, the other leg of the framing square will bear diagonally across the edge of the timber being cut.

The guide may also include means for fixing the framing square inserted within the slot to the guide. This feature may take the form of a set screw or a plurality of set screws passing through the upper portion of the slotted member and frictionally engaging the framing square found within the slot. The slot may also be constructed to hold the framing square by a wedging action.

The outer surface of the fence may be constructed of abrasion resistance and rigid material to truly guide the powered hand tool. The remaining portion of the guide may be built of lighter and less durable material having the advantage of lighter weight.

Since the slotted member may possess a degrees of flexibility, removing the corners presents a larger surface of the slot which aids in the insertion of the framing square within the slot. It may be apparent that a novel framing square guide has been described not before found in the art of carpentry.

It is therefore an object of the present invention to provide a framing square guide which allows the use of powered hand cutting tools in cooperation with a framing square without the need for scoring or marking the line of cutting on the object being cut.

It is another object of the present invention to provide a framing square guide which employs the ability of a framing square to bear on the edge of a timber being cut, and thus provide an accurate perpendicular line of cutting across the object being trimmed.

Yet another object of the present invention is to provide a framing square guide which is easily portable and releasably fixes to a framing square for quick removal and use therewith.

Still another object of the present invention is to provide a framing square guide which is lightweight and durable when used with conventional powered hand cutting tools.

The invention possesses other objects and advantages especially as concerns particular features and characteristics thereof which will become apparent as the specification continues.

Various aspects of the present invention will evolve from the following detailed description of the preferred embodiments thereof which should be taken in conjunction with the accompanying drawings.

BRIEF DESCRIPTION OF THE DRAWINGS

FIG. 1 is a broken top plan view of the invention.

FIG. 2 is a broken end elevational view of the invention.

FIG. 3 is a view taken along lines 3—3 of FIG. 1.

FIG. 4 is a view taken along lines 4—4 of FIG. 2.

FIG. 5 is a top plan view of the invention in use with a framing square.

FIG. 6 is a side view of the invention in use with a framing square.

FIG. 7 is a sectional view of the invention in use with a framing square and a powered hand cutting tool.

DETAILED DESCRIPTION OF THE PREFERRED EMBODIMENTS

The invention as a whole is shown on the Figures and denoted by reference character 10. The framing square guide 10 includes as one of its elements, a slotted member 12 having an upper portion 14 and a lower portion 16. Slot 18 is formed between upper portion 14 and lower portion 16. FIGS. 1 and 2. Lower portion 16 slot 18 includes an opening 19 and a base 21 of slotted member 12 includes a flat lower surface 20 and an upper surface 22. Upper portion 14 of the slotted member 12 has a lower surface 24 and an upper surface 26.

Removing the squared corners of slotted member 12 produces mitered edges 28 and 30. Since upper and lower portions 14 snd 16 of slotted member 12 may possess some flexibility a rectangular slotted member would have corners which tend to close slot 18. Mitered corners 28 and 30 offer a surface which aids in the insertion of framing square 32 therewithin.

Fence 34 connects to slotted member 12 by any method known in the art of jointing. For example, the embodiment shown in the Figures depicts slotted member 12 as integrally formed with fence 34. Fence 34 includes an end plate 36 having an outer surface 38. End plate is constructed of rigid and abrasion resistant material such as stainless steel, aluminum, hardened glass, and like. Fence 34 may extend any desired height above lower surface 20 of lower portion 16, for example, extensions 40 and 42 shown in FIGS. 1 and 2. Outer surface 38 of fence 34 is formed substantially perpendicular to lower surface 20 of lower portion 16 of the slotted member 12. Thus, guide 10 sits on a flat surface with fence 34 in an upright and perpendicular orientation with respect to the flat surface.

Slot 18, FIGS. 3 and 4 may be constructed to lie in a plane augularly disposed in relation to lower surface 20 of lower portion 16. Angle "A" of FIG. 3 has been found to range between 2° and 4° with the standard framing square commercially available.

Set screw 44, which may include a plurality of such set screws, passed through a portion 14 of slotted member 12. Set screw 44 adapts to engage the framing square 32 inserted within slot 18.

Turning to FIGS. 5 through 7, it may be seen that guide 10 Base 21 of slot 18 functions to limit the travel of framing square 32 within slot 18 includes means 46 adapted for fixing framing square 32, inserted within slot 18 to the guide 10. Set screws may function as fixing means 46. However, fixing means 46 is not limited to the use of set screws 44 and may include other embodiments known in the art. For instance, slot 18 may be formed to wedge the framing square 32 therewithin. As may be apparent from FIGS. 5 through 7, guide 10's lower surface 20 rests upon the surface 48 of a piece of material 50 to be cut. Slot 18 may contain a portion of the tongue 52 of framing member 32 or the body 54 of framing member 32 as shown, tongue 52 fits within slot 18. Set screw 44 bears on tongue 52 to retain framing square 32 within slot 18.

As heretofore stated, slot 18 lies in a plane angularly disposed in relation to lower surface 20 of lower portion 16 of slotted member 12. FIG. 6 illustrates that body 54 of framing square 32 extends along the edge 56 of material piece 50. Body 54 of framing square 32 follows the angular disposition of slot 18, that is, downwardly and towards the intersection of the plane of lower surface 20 of lower portion 16. Slot 18 also extends outwardly from fence outer surface 38. Thus, framing member 32 is conveniently fixed from rotational motion about edge 58 of tongue 52. It may be seen that outer surface 38 of fence 34 lies a fixed distance from the edge 60 of tongue 52.

With reference to FIG. 7, a powered hand tool 62 having a blade 64 within a foot 66 may be employed with guide 10. Foot 66 bears on surface 38 of the plate 36 of fence 34. Blade 64 cuts at a predetermined distance from either edge 58 or 60 of tongue 52. In operation, the user inserts tongue 52 of framing square 32 within slot 18 of guide 10. Either edge 58 or 60 is aligned with the line of cutting minus a fixed distance dependant on the type of cutting tool employed. The powered hand cutting tool 62 bears on the outer surface 38 of fence 34 via foot 66. The user rests one hand on the upper surface 26 of slotted member 12 and pushes the tool 62 across the piece of material 50, maintaining contact between the edge of foot 66 and surface 38 of fence 34. As can be seen, use of guide 10 eliminates the scoring or marking or cutting lines and offers a guide surface for a hand cutting tool 62. The resultant trimming is accurate and easily accomplished.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. Framing square guide comprising:
   a. slotted member having an upper surface and a flat lower surface and having a slot therebetween opening into another surface of said slotted member, said slot having a base and being sized for reception of a portion of the framing square into said opening, said base limiting the travel of said framing square within said slot; and
   b. a fence connected to said slotted member, and being substantially perpendicular to and extending above said upper surface, said fence including an outer surface, said lower surface of said slotted member being substantially perpendicular to said outer surface of said fence, said slot lying substantially in a plane angularly disposed to intersect a plane defined by said lower surface of said slotted member and said base having a longitudinal axis which extends parallel to said outer surface.

2. The framing square guide of claim 1 which includes means adapted for fixing the framing square inserted within said slot to the guide.

3. The framing square guide of claim 2 in which said fixing means comprises at least one set screw passing through said upper surface of said slotted member, said set screw adapted for frictionally engaging the inserted framing square.

4. The framing square guide of claim 1 in which said outer surface of said fence is constructed of a rigid abrasion resistant material and said slotted member is an elongated body having blunted corner portions in the vicinity of said slot opening adapted for permitting convenient insertion of the framing square.

5. The framing square guide of claim 1 in which said angular disposition of said slot lies between 2° and 4°.

6. The framing square guide of claim 5 which includes means adapted for fixing the framing square inserted within said slot to the guide.

7. The framing guide of claim 6 in which said fixing means comprises at least one set screw passing through said upper surface of said slotted member, said set screw adapted for frictionally engaging the inserted framing square.

* * * * *